UNITED STATES PATENT OFFICE 2,649,750

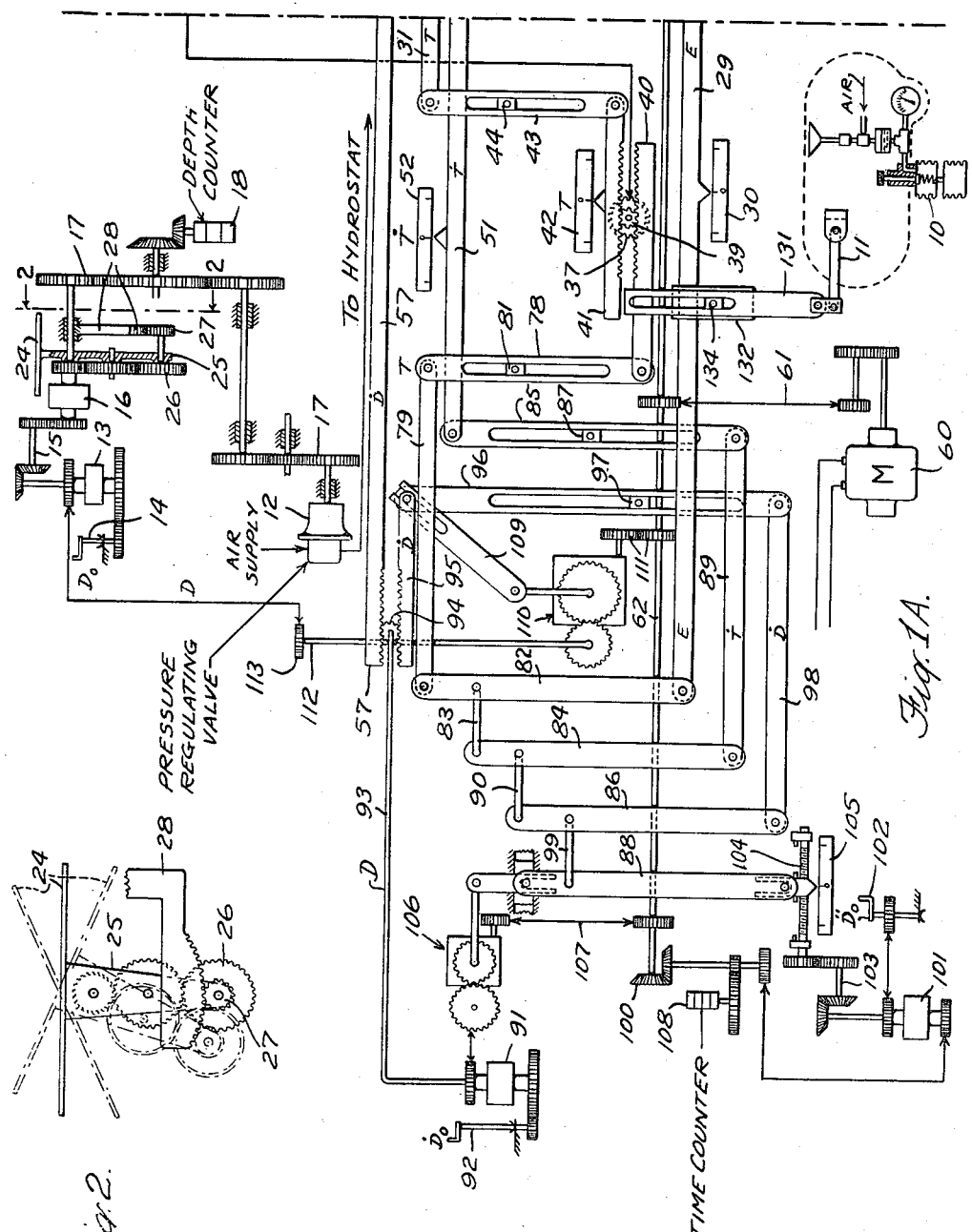

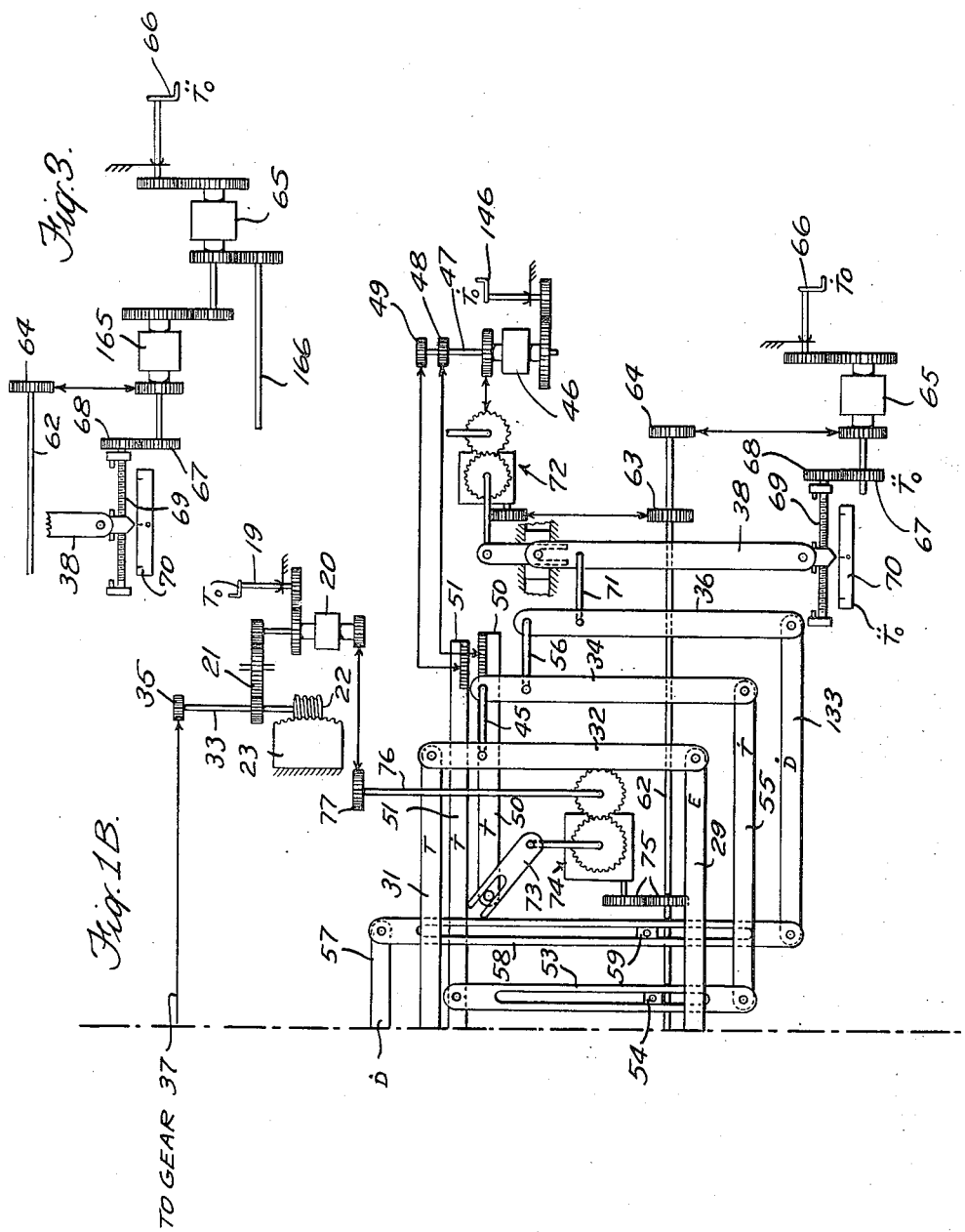

MEANS FOR TESTING TORPEDO DEPTH CONTROL MECHANISM

Edward G. Burgess, Jr., Kew Gardens, N. Y., assignor to The Sperry Corporation, Long Island City, N. Y., a corporation of Delaware Application January 24, 1952, Serial No. 268,012

10 Claims. (Cl. 114—25)

This invention pertains essentially to means for simulating dirigible submarine bodies, such as torpedoes, to test mechanism designed to control the running depth of such bodies.

An example of the type of control mechanism which embodiments of this invention are designed to test, is the torpedo depth control mechanism described in the patent application of William H. Newell, filed April 17, 1951, Serial No. 221,388. In that mechanism pressure responsive means are provided which are settable to predetermined running depths and which are operatively connected to the elevator actuator. In accordance with that invention stability and freedom from periodic disturbance in the control are effected by providing supplemental anticipative control elements which introduce into the control equation derivatives of the depth error. In order to avoid the difficulties associated with the determination of the second derivative of depth error it is contemplated to use the tilt or aspect angle of the torpedo and its first derivative because of the relation of the aspect angle to the rate of change of depth error. The equation solved by the control mechanism of that application is calculated to cause a torpedo when fired promptly to seek its set depth without overrun and to maintain that depth without hunting or periodic disturbances.

It is manifestly impossible to observe in detail the performance of a particular depth control mechanism during the run of an actual torpedo and malfunctioning of the control mechanism may result in loss of the torpedo and automatic elimination of the possibility of analysis of the cause of the malfunctioning. Even where the torpedo is recovered it is difficult to repeat a performance due to the necessity of disassembling the control unit after each run for cleaning. It was therefore realized that it is desirable thoroughly to test the control mechanisms before introducing them into torpedoes under conditions which will with sufficient accuracy simulate a torpedo. The object of this invention is to provide suitable torpedo simulating mechanism which will function for such testing purpose.

Thus this invention contemplates computing mechanism which is designed to solve the linearized equations of motion of the torpedo in a vertical plane. The coefficients in such equations are variable constants the values of which are determined in accordance with the characteristics of each type of torpedo.

To simulate firing conditions a certain depth error and aspect angle of the torpedo are assumed and are set into the simulator and ideally these set-in quantities will be differentially compensated by the functioning of the resultant elevator angle through the computing mechanism of the simulator in such a manner as to eliminate depth error smoothly and without overrun or hunting and so that the aspect angle is correspondingly corrected to its proper running attitude. It is known, of course, that because of the negative buoyancy of the torpedo a certain value of up elevator is required during run.

Disregarding this requirement due to the negative buoyancy of the torpedo, the elevator angle is determined by the depth control mechanism. Under usual firing conditions and hence under usual assumed conditions at the starting up of the simulator, the depth control mechanism will not be within its working range. However, if the mechanism is functioning properly the extreme elevator angle will in a matter of a second or two bring the theoretical torpedo within the working range of the control mechanism, that is, will reduce the depth error to where the elevator angle properly responds to the variation in depth error.

The servo device or other actuator for the elevator of the control mechanism being tested is operatively connected to the input of the computing mechanism of the simulator, and the simulator constantly computes the instant values of depth error and aspect angle and the integrated increments are differentially added to the initial values of those quantities until stability is attained. The linearized equations of motion according to which the simulator operates for the depth error and aspect angle, respectively, are as follows:

(1) $\ddot{D}=K_1\dot{D}+K_2\dot{T}+K_3T+K_4E+K_5t+K_6$ where D is the depth error, T is the aspect angle or tilt of the longitudinal axis of the torpedo to the horizontal, E is the elevator angle, $t$ is time and the constants are mechanical parameters;

(2) $\ddot{T}=K_7\dot{D}+K_8\dot{T}+K_9T+K_{10}E+K_{11}t+K_{12}$ where D, T, E, and $t$ are symbols for the same quantities as in Equation 1 and the constants are other mechanical parameters.

The second derivatives of D and T thus generated are integrated with respect to time to obtain the first derivatives which are fed back into the computations with the proper coefficients for the particular torpedo and are also themselves integrated with reference to time to generate the quantities to neutralize the initial values of D and T.

Preferably the differentials in the simulator computing mechanism are of the pivoted lever type. With this type of differential the coefficients in Equations 1 and 2 are introduced by adjusting the pivots of the levers which operate the links with respect to their centers.

Means such as an artificial depth control may be employed if desired to test the dynamic performance of the whole simulator, but for the purpose of this disclosure theoretical accuracy in performance is assumed. Also, if desired, the output of a sinusoidal or harmonic forcing function unit may be introduced into the mechanism in simulation of wave motion of a certain amplitude and frequency to test the frequency response of the simulator by measurement of E as the output. Thus the frequency response of the simulator can be calculated and compared with the actual measured response. Such frequency response testing means will be illustrated and further described.

The illustrated embodiment of the invention will now be described.

Figs. 1A and 1B are separate sections of a single figure schematically representing the simulator, Fig. 1A being the depth error or D end of the mechanism and Fig. 1B being the torpedo aspect or tilt angle or T end of the mechanism;

Fig. 2 is a detail in elevation of a part of the mechanism indicated by line 2—2 of Fig. 1A;

Fig. 3 is a schematic diagram showing the simulator modified to include the frequency response portion of such a mechanism.

The depth control mechanism to be tested is indicated by the broken line elliptical outline at the lower right-hand corner of Fig. 1A. Air pressure representative of depth enters a hydrostat as indicated which is connected with the pressure responsive bellows 10 of the mechanism under test. This connection takes the place of the vent to the outside water when in a torpedo. Water to a proper height is supplied to the hydrostat through a funnel arrangement and a gauge indicates the pressure. A spring shown in the bellows is adjustable as to tension by means such as the knurled hand knob shown and exerts a pressure upon the diaphragm of the the bellows counter to that of the water pressure, and this spring is set to a selected tension which determines the running depth of the torpedo, that is, the depth at which the hydrostatic pressure will just balance the spring pressure and the deflection of the diaphragm will be zero. Any departure from that neutral condition represents departure from set depth or depth error D.

This bellows diaphragm, as shown and explained in the said Newell application, is connected through the control mechanism with the elevator servo which in this diagram is indicated by the reciprocable link 11 which is operatively connected to the piston of the servo. The position of the link 11 is, therefore, representative of the elevator angle E of the control mechanism being tested. As will be seen, this quantity E is introduced as an input into the simulator computing mechanism.

A pressure regulating valve 12 is connected to an air supply and to the hydrostat so as to deliver pressure to the connection marked AIR variable according to the setting of the valve. The setting of the valve 12 is regulated by a connection from depth setting means as will now be described.

Into one side of a differential 13 through a hand crank a quantity is set in representing initial depth error $D_0$. Friction stay means diagrammatically shown hold the manual setting side of the differential when generated depth error D is introduced into the other side as will later be explained.

The center or spider of differential 13 is connected through gearing 15 to one side of a differential 16 the center of which is connected by gearing 17 with the valve 12. A depth counter 18 may be connected to be operated by the gearing 17 if desired. Thus valve 12 responds to the output of differential 16.

The other quantity which is put into the other side of differential 16 is a corrective or compensative quantity to compensate for the effect upon depth of the tilt angle T of the torpedo due to the noncoincidence of the bellows with the axis of tilt of the torpedo.

Referring to Fig. 1B, it will be seen that a crank 19 frictionally held similarly to crank 14 is provided to set initial tilt angle $T_0$ into one side of a differential 20 into the other side of which generated T is introduced as will later be described. The center of differential 20 therefore delivers the instant value of T and is accordingly connected by gearing 21 to operate a worm gear 22 meshing with a fixed arcuate rack 23 and hence tilting the platform on which the simulator is mounted through the angle T.

This platform, marked 24 in Figs. 1A and 2, has a depending leg 25 on which is mounted gearing 26 which is connected to the other side of differential 16. The lower gear of train 26 is mounted on a common axis with pinion 27 which meshes with a fixed arcuate rack 28, this rack and other parts similarly indicated, such as the rack 23 and the bearings for the gearing 17 being fixed to the base support for the platform 24 and the simulator mechanism carried thereby. The tilting of platform 24 through the angle T as explained therefore introduces a compensating quantity into differential 16 which modifies the output of differential 13 by the same amount that the torpedo angle T introduces a depth component. Therefore the valve 12 is responsive only to true depth error, that is, the distance, positive or negative, of the tilt axis of the torpedo from the set running depth.

The elevator actuator 11 is operatively connected to a sliding link 29 the position of which, therefore, is an indication of the value of E. If desired an E scale 30 may be provided. The connection between link 11 and link 29 in the construction shown consists of a lever 131 pivoted at one end to the link 11 and pivotally engaging an arm 132 by means of an adjustable pivot block 134 the adjusted position of which determines the value of the coefficient for E in each equation for the particular type of torpedo which is being simulated. This quantity is introduced in the computing mechanisms in a manner which will now be described.

The T computing mechanism shown in Fig. 1B will first be described. This mechanism has four differentially connected levers which are numbered 32, 34, 36 and 38, respectively, the output of the final lever 38 being the second derivative of T indicated by the coventional symbol $\ddot{T}$. As will be seen this output is integrated with respect to time to obtain the first derivative which is indicated by the symbol $\dot{T}$. This quantity in turn is integrated to obtain the generated T which is fed back to differential 20 to neutralize the initial value of T indicated as $T_0$. It is also fed back into the computer, as will be seen.

The link 29 is pivotally connected to one end of lever 32 to the other end of which is connected link 31. This link 31 is positioned in accordance with the value of T with a selected coefficient as will now be described.

Referring again to the T differential 20 in

Fig. 1B, it will be seen that the worm gear 22 is on shaft 33 on which is fixed gear 35 which meshes with gear 37 (Fig. 1A) as indicated diagrammatically by the line connecting gears 35 and 37. On the shaft of gear 37 is fixed pinion 39 which meshes with slidable racks 40 and 41. The position of the racks, therefore, represents T which if desired may be indicated upon a scale 42.

The position of rack 41 is transmitted to link 31 through lever 43 which pivots upon sliding block 44 the position of which determines the coefficient for T transmitted by link 31 and varies with the type of torpedo being simulated.

The quantities added by differential 32 are therefore $K_9T$ and $K_{10}E$, this summation being introduced into the upper end of lever 34 by the connecting link 45. To the lower end of lever 34 is introduced the quantity T with a proper coefficient as will now be described.

A differential 46 in Fig. 1B receives in one side the generated value of $\dot{T}$ and in the other side the initial value of $\dot{T}$ if one is set in by hand crank 146, indicated by the symbol $\dot{T}_6$. The center of differential 46 drives shaft 47 on which are fixed gears 48 and 49 which mesh, respectively, with racks on links 50 and 51 as indicated by the connecting lines. The positions of links 50 and 51, therefore, represents the value of $\dot{T}$ which if desired may be indicated on a scale 52.

Pivoted at one point to link 51 is lever 53 which is pivoted on sliding block 54 the position of which determines the coefficient for the $\dot{T}$ quantity in the $\ddot{T}$ equation. This lever 53 is pivotally connected at its other end to link 55, which is connected to the lower end of differential lever 34 to introduce the quantity $\dot{T}$ with its appropriate coefficient. Therefore the output of differential lever 34 is $K_9T+K_{10}E+K_8\dot{T}$ and this summation is introduced into the upper end of lever 36 by connecting link 56.

To the lower end of lever 36 is introduced the quantity $K_7\dot{D}$. From the $\dot{D}$ computing side of the simulator mechanism comes the quantity $\dot{D}$ through link 57 in a manner which will be later described. Link 57 is pivotally connected to the upper end of lever 58 which is pivoted on sliding block 59 the position of which determines the value of the coefficient for $\dot{D}$ in the $\ddot{T}$ equation. Lever 58 is pivoted at its lower end to link 133 which is pivoted to the lower end of differential lever 36. The output of differential 36 is, therefore, $K_7\dot{D}+K_8\dot{T}+K_9T+K_{10}E$. It now remains to obtain the quantities $K_{11}t$ and $K_{12}$ in order to satisfy Equation 2.

Time is obtained from a synchronous motor 60 shown in Fig. 1A. This motor through a train of gearing 61 drives time shaft 62 on the right end of which are fixed two gears 63 and 64, the former of which is connected to drive the time element of the $\dot{T}$ integrator as will presently appear, and the latter of which meshes with the gear on one side of a differential 65. To the other side of the differential is operatively connected a hand crank 66 which is also frictionally secured so as to lock that side of the differential against movement by other means than crank 66. This crank 66 may be used to set in initial values of $\ddot{T}$, designated as $\ddot{T}_0$, should it be desired to introduce such value into the problem, and may also be used to eliminate any residual value of $\ddot{T}$ at the end of a problem.

The center of differential 65 drives gear 67 which meshes with gear 68 on screw 69. This screw feeds a nut which is pivotally connected to the lower end of lever 38. This nut may be used as an index to indicate on scale 70 any value of $\ddot{T}_0$ which is set in.

The output of lever 36 is transmitted to the upper end of lever 38 by connecting link 71. The differential 65 through the screw 69 adds the quantity $K_{11}t$, the constant being a mechanical parameter. Also, it will be apparent that time with the proper coefficient will continue to be fed into the computing mechanism after the initiation of the problem to compensate for the change in weight of the torpedo due to the consumption of fuel during the run.

The quantity $K_{12}$ represents a torque due to the lack of coincidence of the center of gravity and center of buoyancy of the torpedo, and therefore represents a required elevator angle to create an equivalent counter torque. This is introduced in the gearing and so is a mechanical parameter. Because of the continued introduction of time as explained in the immediately preceding paragraph, this elevator angle due to the quantity $K_{12}$ is being constantly changed as the fuel is consumed.

The output of lever 38 therefore satisfies Equation 2 and is $\ddot{T}$. As shown this is fed into an integrator 72 which may be of various types but preferably is of the tangent type shown in the Newell Patent No. 2,412,468 of December 10, 1946, entitled Variable Speed Drive. Such an integrator is diagrammatically represented and all of the integrator in the illustrated mechanism are of that type.

This integrator and all the others as well are connected to the time shaft 62 for the introduction of time. The input of integrator 72 is, therefore, $\ddot{T}$ and the output is $\dot{T}$ which is fed into the one side of the $\dot{T}$ differential 46. As explained the center of this differential slides link 50 which is connected through pivoted arm 73 as an input to tangent integrator 74 the time element of which is connected to time shaft 62 through gearing 75 and the output of which, which is generated T, is connected by shaft 76 and gear 77 with the side of T differential 20 opposite the side of hand crank 19.

The D computing mechanism which satisfies Equation 1 will now be described. This is shown in Fig. 1A. The four differential levers of this portion are numbered 82, 84, 86 and 88, respectively. The quantities T and E with proper coefficients are added in the first differential 82, the link 29 being pivotally connected to its lower end and the slide 40 which, as explained, is actuated by the output of the T differetnial 20, being operatively connected with the upper end of lever 82 through lever 78, and connecting link 79. The lever 78 is pivoted on adjustable block 81 the position of which determines the coefficient for T.

The output of lever 82 is therefore $K_3T+K_4E$, and this is introduced into the top end of lever 84 by connector 83. To this quantity there is added in differential 84 the quantity $\dot{T}$ with its proper coefficient. As will be seen, this is effected by lever 85 with its adjustable pivot 87 to determine its coefficient, which lever 85 is pivoted at its upper end to the $\dot{T}$ slide 51 and has its lower end connected to the lower end of differential 84 by the connecting link 89. Thus the differential 84 adds $K_2T$ to the input at its upper end so that its output to differential 86 through connector 90 is $K_2\dot{T}+K_3T+K_4E$.

The next differential 86 adds the quantity $\dot{D}$ with the proper coefficient. A $\dot{D}$ differential 91 has the generated $\dot{D}$ fed into one side as will be explained, and an initial $\dot{D}$ value, designated $\dot{D}_0$, set in the other side if the problem calls for such a quantity, through hand crank 92. This hand crank also has the friction hold explained in connection with hand crank 14. The hand crank 92 may also be used to reset the $\dot{D}$ value to zero.

The center of differential 91 through shaft 93 operates pinion 94 which meshes with racks on slides 57 and 95, the position of which represents $\dot{D}$. The slide 57 is used to introduce $\dot{D}$ into the T end of the computer, as above explained. The slide 95 is used to introduce $\dot{D}$ into the D end of the computer, being pivotally connected to the upper end of lever 96 which is pivoted on sliding block 97 the position of which determines the coefficient for $\dot{D}$. The lower end of lever 96 is connected to the lower end of differential 86 by means of link 98. Therefore lever 86 adds the quantity $K_1\dot{D}$ to its input at the upper end so that its output is $K_1\dot{D}+K_2\dot{T}+K_3T+K_4E$. This output is transmitted to the upper end of differential lever 88 through connector 99.

The quantity $K_5t$ comes in at the lower end of differential 88. The time shaft 62 is connected through gearing 100 to one side of a differential 101 into the other side of which an initial value of $\ddot{D}$, designated $\ddot{D}_0$, may be set if the problem requires, by means of crank 102 which is also frictionally held as above explained, or the crank may be used to reset the mechanism to zero.

The center of differential 101 is connected through gearing 103 to a screw 104 the nut of which is pivotally connected to the lower end of lever 88 and may cooperate with scale 105 to indicate the quantity $\ddot{D}$ initially set in. The constant $K_5$ which is the coefficient for $t$ appears in the gearing and similarly the mechanical parameter $K_6$ to compensate for the buoyancy of the torpedo either positive or negative, is designed in the gearing. The output of differential 88 therefore satisfies Equation 1 and is generated $\ddot{D}$. As indicated, this quantity is fed as an input to a tangent integrator 106 the time element of which is connected by gearing 107 to the time shaft 62. The output of integrator 106 is $\dot{D}$ and is delivered to the opposite side of the $\dot{D}$ differential 91. If desired a counter 108 indicating actual elapsed time may be coupled to the time shaft.

The $\dot{D}$ slide 95, in addition to operating lever 96 to introduce the $\dot{D}$ quantity into the computer, also actuates arm 109 to introduce $\dot{D}$ into another tangent integrator 110 the time element of which is connected to time shaft 62 through gearing 111. The output of integrator 110 which is generated D is through shaft 112 and gear 113 fed into the other side of the D differential 13.

As above explained means may be provided to introduce the output of a harmonic forcing function unit to test the frequency response of the simulator by measurement of E as an output. Such an arrangement is shown in Fig. 3. The output of a harmonic forcing unit is introduced through shaft 166 of a certain amplitude and frequency to simulate the sinusoidal changes in depth error due to wave motion. This harmonic motion is introduced through shaft 166 into the side of differential 65 opposite the hand crank side, and the center of differential 65 is in this case connected to one side of another differential 165 to the opposite side of which time shaft 62 is connected. Then the output of this differential is connected to the screw 69, the mechanism otherwise being the same as that shown in Fig. 1B. Thus the harmonic motion input is differentially connected with the tilt angle output of the T computer.

In operating the simulator, after connecting the valve 12 with the hydrostat and connecting the elevator actuator with the input through link 11, certain initial values of $D_0$ and $T_0$ are set in by cranks 14 and 19 according to the problem. Also for some problems values of one or more of the derivatives of the initial quantities may be set in by hand cranks 146, 66, 92 or 102. This will induce a certain pressure on the hydrostat and a certain elevator angle E. The time motor is then started and the time is noted that it takes the torpedo to get within the control zone if it was fired outside the range of the mechanism, and then the counters are watched to observe the performance as the depth error is eliminated. If the instant values of E are correct to maintain proper tilt angles to bring the torpedo approximately asymtotically into the proper depth without excessive overrun and to hold it there during the run this will be evidenced by the absence of generated D and T. Failure to attain such stable condition within tolerable time indicates a malfunctioning of the control mechanism which is being tested and ordinarily the cause of such malfunctioning.

It is obvious that the invention is not restricted to the particular form of mechanism shown in the drawings and above particularly described. For example, while in this embodiment the link 29 is shown as a common member leading to both computer sections, for certain types of control it may preferably be formed as two separate members having independent pivotal connections with the lever 131 at different variable distances from the fulcrum of the lever. Various equivalent mechanical means for carrying out the invention will occur to those skilled in the art without departing from the spirit and scope of the invention as defined in the following claims.

What is claimed is:

1. Means for testing torpedo depth control mechanism having an elevator actuator and hydrostatic pressure responsive means connected to operate the elevator actuator and settable for predetermined depths, said testing means comprising a pressure regulator connectable to the pressure responsive means of a control mechanism being tested, manual pressure setting means representative of firing depth operatively connected to the pressure regulator, computer mechanism operative to compute depth error, means adapted to connect the elevator actuator of said control mechanism to the input of said computer mechanism, and means differentially connecting the output of the computer mechanism to the manual pressure setting means.

2. Means for testing torpedo depth control mechanism having an elevator actuator and hydrostatic pressure responsive means connected to operate the elevator actuator and settable for predetermined depths, said testing means comprising a pressure regulator connectable to the pressure responsive means of a control mechanism being tested, manual pressure setting means representative of firing depth operatively connected to the pressure regulator, manual means to introduce values representative of the tilt angle of a torpedo axis to the horizontal, means differentially connecting the tilt angle introducing means and the manual pressure setting means adapted to compensate for the depth factor due to the tilt angle, computer mechanism operative to compute depth error, means adapted to connect the elevator actuator of said control mechanism to the input of said computer mechanism, and means differentially connecting the output of the computer mechanism to the manual pressure setting means.

3. Means for testing torpedo depth control mechanism having an elevator actuator and hydrostatic pressure responsive means connected to operate the elevator actuator and settable for predetermined depths, said testing means comprising a pressure regulator connectable to the pressure responsive means of a control mechanism being tested, manual pressure setting means representative of depth error operatively connected to the pressure regulator, manual means to introduce values representative of the tilt angle of a torpedo axis to the horizontal, means differentially connecting the tilt angle introducing means and the manual pressure setting means adapted to compensate for the depth factor due to the tilt angle, computer mechanism operative to compute values of depth error and of tilt angle, means adapted to connect the elevator actuator of said control mechanism to the input of said computer mechanism, means differentially connecting the depth error output of the computer mechanism to the manual pressure setting means, and means differentially connecting the tilt angle output of the computer mechanism to the manual tilt angle introducing means.

4. Testing means as defined in claim 3 in which the computer mechanism is designed to solve the instant values of depth error according to the equation $\ddot{D}=K_1\dot{D}+K_2\dot{T}+K_3T+K_4E+K_5t-K_6$ where D is depth error, T is tilt angle of the torpedo, E is elevator angle, $t$ is time and the constants are mechanical parameters.

5. Testing means as defined in claim 3 in which the computer mechanism is designed to solve the instant values of the tilt angle of the torpedo according to the equation $$\ddot{T}=K_7\dot{D}+K_8\dot{T}+K_9T+K_{10}E+K_{11}t-K_{12}$$

where T is the tilt angle of the torpedo, D is the depth error, E is the elevator angle, $t$ is time and the constants are mechanical parameters.

6. Testing means as defined in claim 3 in which the computer mechanism is designed to solve the instant values of acceleration in depth displacement and includes means for integrating the computed acceleration to determine the rate of depth displacement and a second integrator to calculate increments of depth displacement, such increments comprising said depth error output of the computer mechanism.

7. Testing means as defined in claim 3 in which the computer mechanism is desgined to solve the instant values of acceleration in tilt angle displacement and includes means for integrating the computed acceleration to determine the rate of tilt angle displacement and a second integrator to calculate increments of tilt angle displacement, such increments comprising the tilt angle output of the computer mechanism.

8. Testing means as defined in claim 3 in which the computer mechanism is designed to solve the instant values of acceleration in depth displacement and the instant values of acceleration in tilt angle displacement and includes two pairs of integrators, the integrators of each pair being connected in tandem, together with means to feed the continuously computed value of acceleration in depth displacement to the first integrator of one pair and the continuously computed value of acceleration in tilt angle displacement to the first integrator of the other pair, the output of the second integrator of the said one pair constituting the said depth error output of the computer mechanism and the output of the second integrator of said other pair constituting the said tilt angle output of the computer mechanism.

9. Testing means as defined in claim 8 in which the mechanism for computing the accelerations comprises an input slide coupled to the elevator actuator and a first lever at each end of the slide differentially connecting the slide to the output of manual tilt angle introducing means, a second lever at each end differentially connecting the output of the respective first lever to the output of the first integrator of the said other pair of integrators and a third lever at each end differentially connecting the output of the respective second lever to the output of the first integrator of the said one pair of integrators.

10. Means for testing torpedo depth control mechanism having an elevator actuator and hydrostatic pressure responsive means connected to operate the elevator actuator, said testing means comprising a pressure regulator connectable to the pressure responsive means of a control mechanism being tested, manual pressure setting means representative of firing depth operatively connected to the pressure regulator, manual means to introduce values representative of the tilt angle of a torpedo axis to the horizontal, means differentially connecting the tilt angle introducing means and the manual pressure setting means adapted to compensate for the depth factor due to tilt angle, computer mechanism operative to compute values of depth error, a second computer mechanism adapted to compute values of tilt angle, means adapted to connect the elevator actuator to both of said computer mechanisms, means to combine a harmonic motion input differentially with the tilt angle output of the second computer mechanism, means differentially connecting the said combined output to the manual tilt angle introducing means and means differentially connecting the depth error output of the first computer mechanism to the manual pressure setting means.

EDWARD G. BURGESS, Jr.

References Cited in the file of this patent

UNITED STATES PATENTS

| Number | Name | Date |
|---|---|---|
| 2,402,617 | Fetzer et al. | June 25, 1946 |